(12) United States Patent
Romem et al.

(10) Patent No.: US 10,678,455 B2
(45) Date of Patent: Jun. 9, 2020

(54) SYSTEM AND METHOD FOR INCREASED EFFICIENCY THIN PROVISIONING WITH RESPECT TO GARBAGE COLLECTION

(71) Applicant: Excelero Storage Ltd., Tel Aviv (IL)

(72) Inventors: Yaniv Romem, Jerusalem (IL); Ofer Oshri, Kfar Saba (IL); Omri Mann, Jerusalem (IL)

(73) Assignee: Excelero Storage Ltd., Tel Aviv (IL)

( * ) Notice: Subject to any disclaimer, the term of this patent is extended or adjusted under 35 U.S.C. 154(b) by 109 days.

(21) Appl. No.: 15/635,452

(22) Filed: Jun. 28, 2017

(65) Prior Publication Data
US 2018/0004448 A1 Jan. 4, 2018

Related U.S. Application Data

(60) Provisional application No. 62/358,011, filed on Jul. 3, 2016.

(51) Int. Cl.
*G06F 3/06* (2006.01)
*G06F 12/02* (2006.01)

(52) U.S. Cl.
CPC .......... *G06F 3/0631* (2013.01); *G06F 3/0604* (2013.01); *G06F 3/0605* (2013.01); *G06F 3/067* (2013.01); *G06F 3/0665* (2013.01); *G06F 3/0683* (2013.01); *G06F 12/0253* (2013.01)

(58) Field of Classification Search
CPC .... G06F 3/0631; G06F 3/0604; G06F 3/0605; G06F 3/0665; G06F 3/067; G06F 3/0683; G06F 3/0608; G06F 3/061; G06F 3/0629; G06F 3/064; G06F 3/0644; G06F 3/0662; G06F 12/023; G06F 12/0253
See application file for complete search history.

(56) References Cited

U.S. PATENT DOCUMENTS

| | | | |
|---|---|---|---|
| 6,453,403 B1 * | 9/2002 | Czajkowski | G06F 12/0253 707/999.2 |
| 7,949,637 B1 | 5/2011 | Burke | |
| 8,156,306 B1 | 4/2012 | Raizen et al. | |
| 8,332,612 B1 | 12/2012 | Raizen et al. | |
| 8,751,727 B2 * | 6/2014 | Kawamura | G06F 3/0619 707/813 |
| 8,775,368 B1 | 7/2014 | Burke et al. | |
| 2006/0236063 A1 * | 10/2006 | Hausauer | G06F 12/1081 711/170 |
| 2007/0011658 A1 * | 1/2007 | Stephens | G06F 12/0269 717/127 |
| 2008/0120459 A1 * | 5/2008 | Kaneda | G06F 11/1451 711/112 |
| 2012/0331018 A1 * | 12/2012 | Khanna | G06F 12/023 707/813 |
| 2012/0331242 A1 * | 12/2012 | Shaikh | G06F 12/0261 711/154 |
| 2015/0142976 A1 * | 5/2015 | Farasat | H04L 47/70 709/226 |
| 2015/0347025 A1 * | 12/2015 | Law | G06F 3/0611 711/103 |

* cited by examiner

*Primary Examiner* — Michael Krofcheck
(74) *Attorney, Agent, or Firm* — M&B IP Analysts, LLC

(57) ABSTRACT

A system and method for increased efficiency thin provisioning of data storage. The method includes: receiving a request for storage allocation from a client device; and allocating, to the client device, at least a portion of a first storage of the plurality of storages when a garbage collector of the first storage is turned off.

18 Claims, 4 Drawing Sheets

SYSTEM AND METHOD FOR INCREASED EFFICIENCY THIN PROVISIONING WITH RESPECT TO GARBAGE COLLECTION

CROSS-REFERENCE TO RELATED APPLICATIONS

This application claims the benefit of U.S. Provisional Application No. 62/358,011 filed on Jul. 3, 2016, the contents of which are hereby incorporated by reference.

TECHNICAL FIELD

The present disclosure relates generally to data storage allocation, and more particularly to thin provisioning of storage allocation.

BACKGROUND

As society becomes increasingly data driven, data storage needs have increased exponentially in recent years. As a result, methods for both larger amounts of storage and more efficient use of storage are often desirable.

In traditional storage provisioning models, storage space is allocated beyond current needs in anticipation of potential future needs. Although this allows for ensuring that sufficient space is available at any given time, the unneeded allocation results in low utilization and wasted storage resources.

One existing method for optimizing the efficiency of storage use in storage area networks is thin provisioning, which includes allocating storage space flexibly among multiple users based on the minimum amount of space needed by each user at any given time. Thin provisioning typically gives a user of a client device the impression that more physical resources are available than are actually allocated. This results in increased storage efficiency, as storage blocks are allocated on-demand.

Another existing solution for reducing wasted storage space is garbage collection. Garbage collection is a form of automatic memory management in which a garbage collector finds data objects that are not being used by a program and frees the portion of memory storing the data object, thereby reclaiming that portion of memory. Although garbage collection can result in increased data storage efficiency due to fewer wasted resources, garbage collection typically results either in slower performance or requires additional memory to have comparable speed to explicit memory management.

It would therefore be advantageous to provide a solution that would provide further improvements to storage efficiency.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein also include a method for increased efficiency thin provisioning. The method comprises: receiving a request for storage allocation from a client device; and allocating, to the client device, at least a portion of a first storage of the plurality of storages when a garbage collector of the first storage is turned off.

Certain embodiments disclosed herein also include a non-transitory computer readable medium having stored thereon causing a processing circuitry to execute a process, the process comprising: receiving a request for storage allocation from a client device; and allocating, to the client device, at least a portion of a first storage of the plurality of storages when a garbage collector of the first storage is turned off.

Certain embodiments disclosed herein also include a system for increased efficiency thin provisioning. The system includes: a processing circuitry; and at least one memory, the at least one memory containing instructions that, when executed by the processing circuitry, configure the system to: receive a request for storage allocation from a client device; and allocate, to the client device, at least a portion of a first storage of the plurality of storages when a garbage collector of the first storage is turned off.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
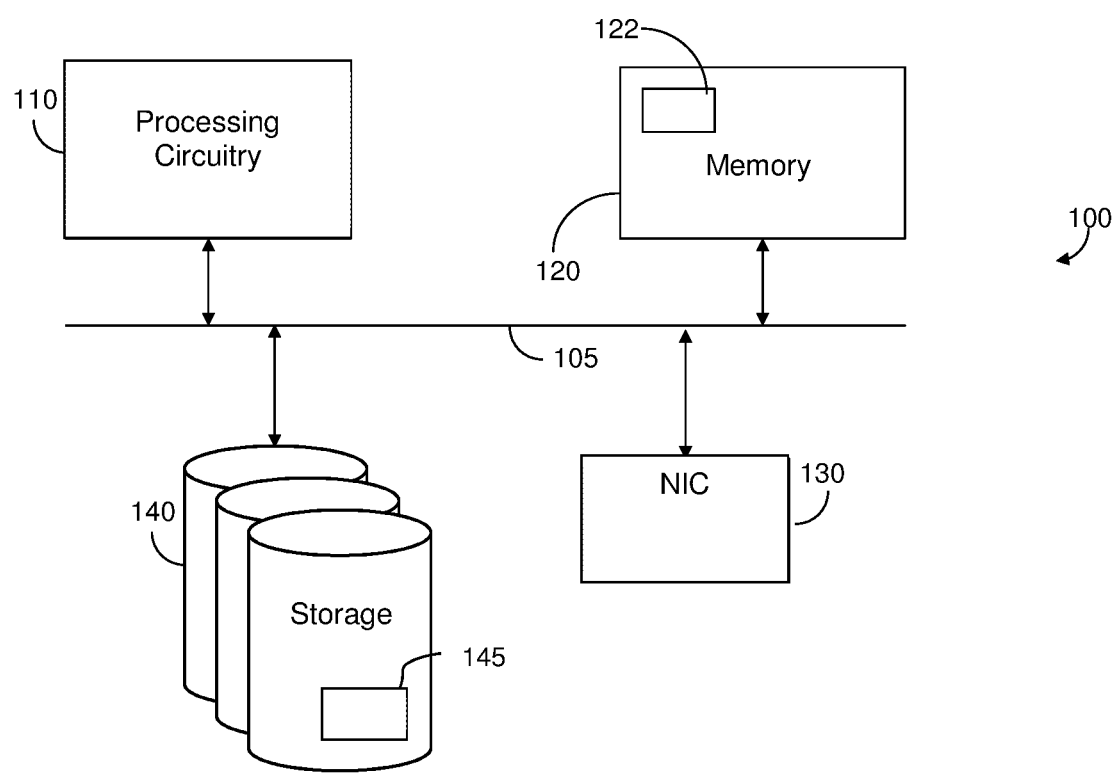
FIG. 1 is a schematic diagram of a storage server according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for increased efficiency thin provisioning. A check is performed to determine if a garbage collector of a first storage is active when a request for storage space is received from a client device. When the garbage collector is inactive, a portion of the first storage is allocated to the client device. When the garbage collector is active, either a portion of a second storage may be allocated or the garbage collector may be turned off such that a portion of the first storage may be allocated to the client device. In some embodiments, a load balancer may be configured to manage garbage collection among multiple storages.

The embodiments disclosed herein may provide increased efficiency of storage usage as compared to, for example, thin provisioning of storage space or garbage collection alone. Specifically, the disclosed embodiments may be utilized to more efficiently allocate storage space, as well as to increase response times and latency for write operations.

FIG. 1 shows an example schematic diagram illustrating a storage server 100 according to an embodiment. The storage server 100 includes a processing circuitry 110, a memory 120, a network interface controller (NIC) 130, and at least one storage 140 (hereinafter referred to as a storage 140, merely for simplicity purposes). In an embodiment, the components of the storage server 100 may be communicatively connected via a bus 105.

The processing circuitry 110 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 120 may be volatile (e.g., RAM, etc.), non-volatile (e.g., ROM, flash memory, etc.), or a combination thereof. In one configuration, computer readable instructions to implement one or more embodiments disclosed herein may be stored in the storage 140.

Alternatively or collectively, the memory 120 may be configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 110 to provide increased efficiency thin provisioning of storage space as described herein.

The memory 120 may include a memory portion 122 containing the instructions for causing the processing circuitry 110 to provide increased efficiency thin provisioning of storage space.

The storage 140 may be magnetic storage, optical storage, and the like, and may be realized, for example, as flash memory or other memory technology, CD-ROM, Digital Versatile Disks (DVDs), or any other medium which can be used to store the desired information. The storage 140 may store instructions for executing the methods as described herein. In some implementations, the storage server 100 may include a plurality of storages 140. The storage 140 also includes a garbage collector 145. The garbage collector 145 is configured to perform garbage collection to reclaim garbage data objects of the storage 140.

The network interface controller 140 allows the storage server 100 to communicate with a network (not shown) for purposes such as, but not limited to, receiving data to be stored in the storage 140, providing access to data stored in the storage 140, and the like. The communications via the network may therefore be utilized to provide remote direct memory access (RDMA) to data stored in the storage 140 by a client device (e.g., the client device 310, FIG. 3). Specifically, the network interface controller 130 may enable communication via RDMA protocol such as, but not limited to, Infiniband, RDMA over Converged Ethernet (RoCE), iWARP (Internet Wide Area Remote Direct Memory Access [RDMA] Protocol), and the like. Infiniband is a communication protocol for high performance computing that offers high throughput and low latency. It should be noted that Infiniband, RoCE, and iWARP are discussed herein merely for example purposes, and that other communication protocols may be equally utilized in accordance with the embodiments disclosed herein without departing from the scope of the disclosure.

Figure 2:
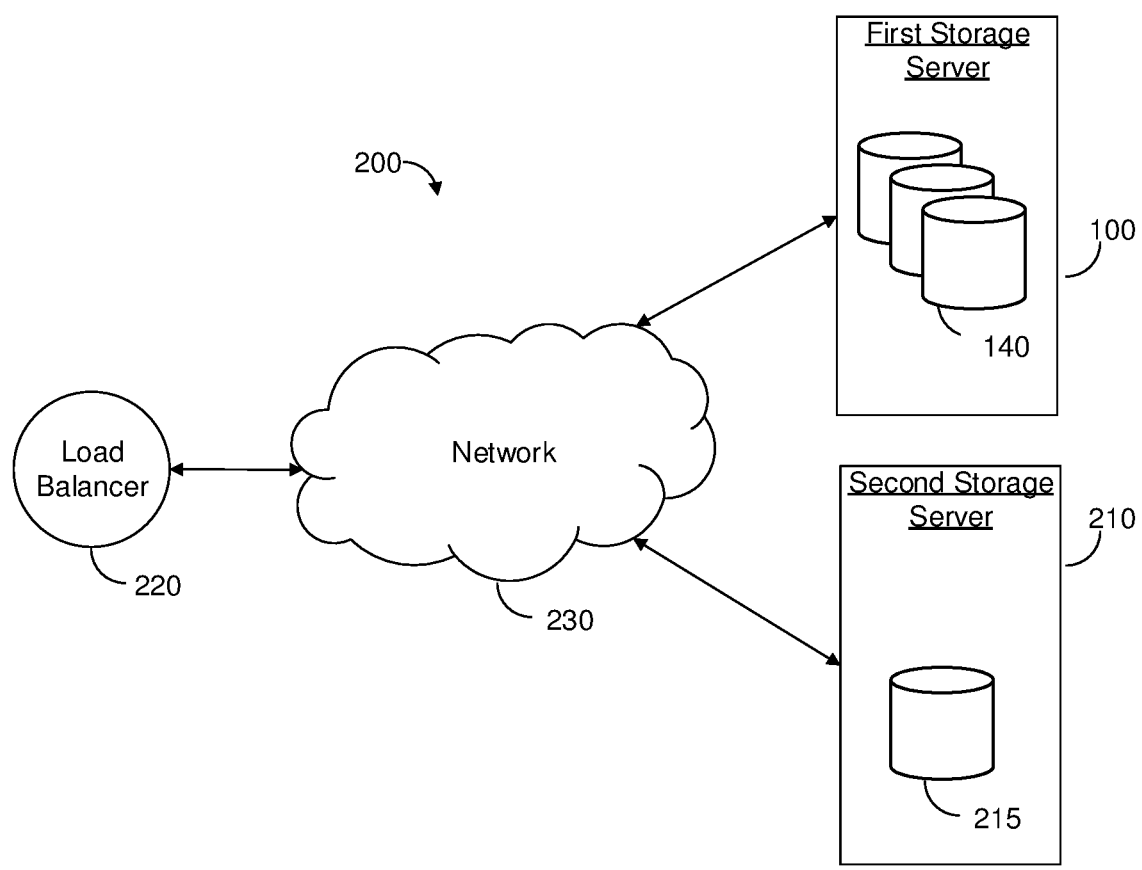
FIG. 2 is a network diagram utilized to describe allocation of storage space to storage servers according to various disclosed embodiments.

FIG. 2 shows an example network diagram of a thin provisioned storage system 200 according to an embodiment. In an example implementation, the storage system 200 includes the storage server 100 (hereinafter referred to as the "first storage server 100," merely for clarity purposes) and a second storage server 210 communicatively connected to a load balancer 220 over a network 230. The network 230 may be, but is not limited to, the Internet, the world-wide-web (WWW), a local area network (LAN), a wide area network (WAN), a metro area network (MAN), and other networks capable of enabling communication between the elements of the network diagram 230.

The first storage server 100 includes at least one storage 140. The second storage server 210 includes a storage 215. Each of the storage 140 and the storage 215 may include a garbage collector (not shown in FIG. 2).

The load balancer 220 is configured to distribute requests for allocations of storage space of the first storage server 100 and the second storage server 210 as described herein. The requests may be received from, for example, client devices (e.g., the client devices 310, FIG. 3). In some implementations, the load balancer 220 may be implemented as a storage server. To this end, the first storage server 100 or the second storage server 210 may include or be included in the load balancer 220, or may be otherwise communicatively connected to the load balancer 220.

It should be noted that the embodiments described herein with respect to FIG. 2 are discussed as featuring a first storage server 100 and a second storage server 210 merely for simplicity purposes and without limiting the disclosed embodiments. Additional storage servers (not shown) may be equally utilized without departing from the scope of the disclosure. Each of the storage servers may be, but are not limited to, configured as is the storage server 100 described herein above with respect to FIG. 1.

It should also be noted that the second storage server 210 is depicted as including one storage 215 merely for simplicity purposes and without limitation on the disclosed embodiments. The second storage server may include additional storages (not shown) without departing from the scope of the disclosure.

It should be further noted that the elements of the thin provisioned storage system 200 are described as being connected via a network merely for example purposes and without limitation on the disclosed embodiments. The load balancer 220 may directly communicate with the first storage server 100, the second storage server 210, or both, without departing from the scope of the disclosure.

Figure 3:
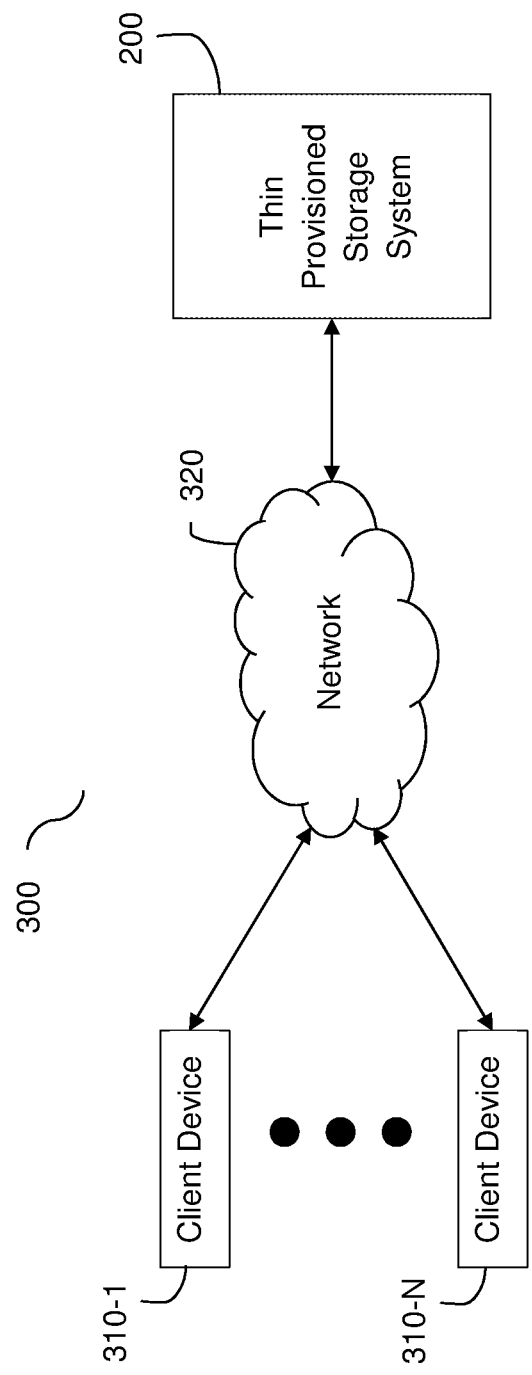
FIG. 3 is a network diagram utilized to describe allocation of storage space by a storage server according to various disclosed embodiments.

FIG. 3 is an example network diagram 300 utilized to describe allocation of storage space by a storage server according to various disclosed embodiments. In the example network diagram 300, the thin provisioning storage system 200 is communicatively connected to a plurality of client devices 310-1 through 310-N, where N is an integer greater than or equal to 1 (hereinafter referred to individually as a client device 310 and collectively as client devices 310, merely for simplicity purposes) via a network 320. The network 320 may be, but is not limited to, the Internet, the world-wide-web (WWW), a local area network (LAN), a wide area network (WAN), a metro area network (MAN), and other networks capable of enabling communication between the elements of the network diagram 320.

The thin provisioned storage system 200 is configured to receive requests for allocations of storage space from the client devices 310 and to perform thin provisioning of storage space according to the disclosed embodiments. Specifically, the thin provisioned storage system 200 is configured to manage garbage collection and storage allocation, thereby increasing efficiency of storage with respect to use of computing resources such as memory and performance parameters such as responsiveness and latency.

Figure 4:
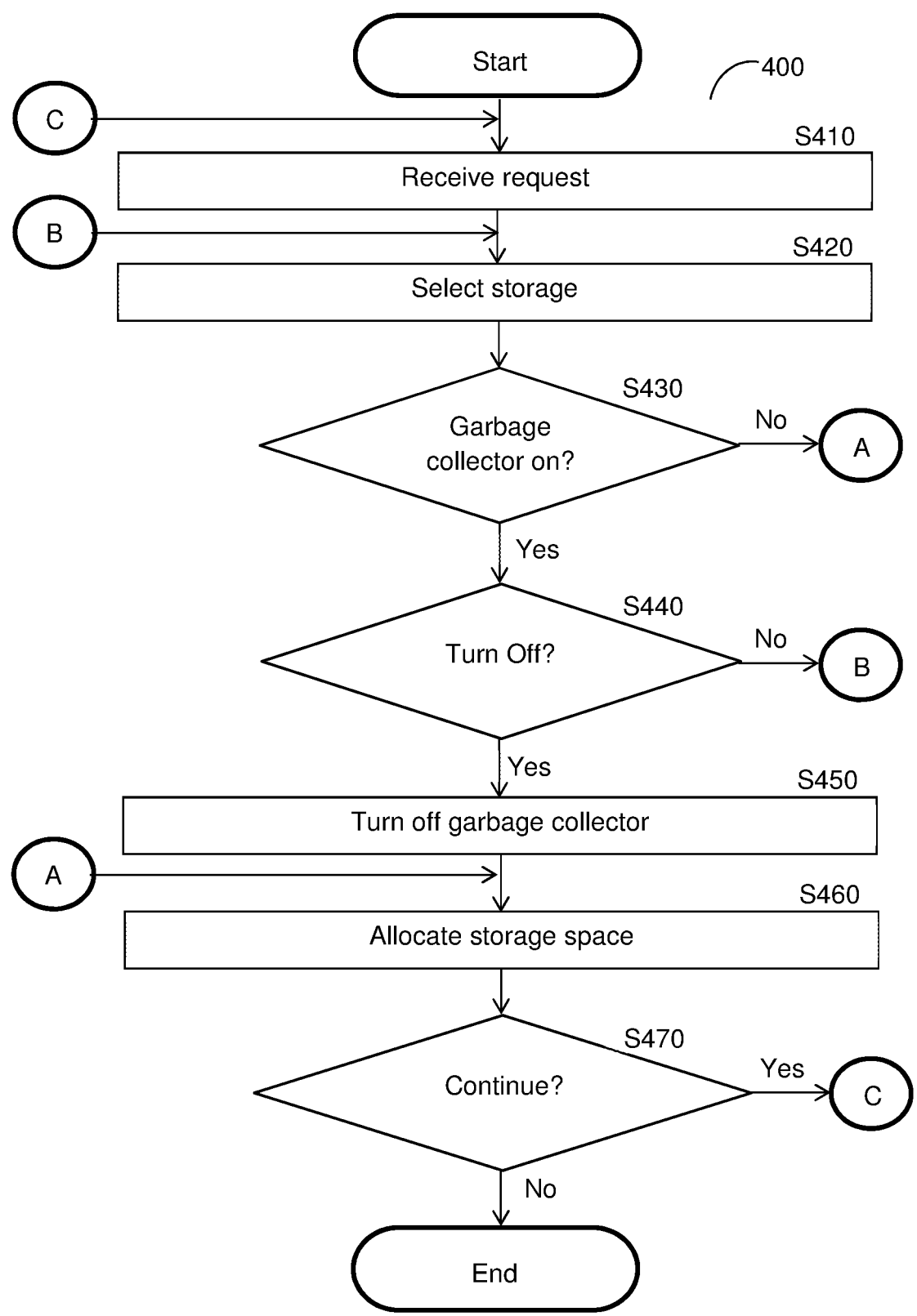
FIG. 4 is a flowchart of a method for increased efficiency thin provisioning according to an embodiment.

FIG. 4 is an example flowchart 400 of a method for increased efficiency thin provisioning according to an embodiment. In an embodiment, the method may be performed by the load balancer 220 or the first storage server 100 to allocate portions of storage of a plurality of storage servers (e.g., the first storage server 100 and the second storage server 210, FIG. 2).

At S410, a request for storage allocation is received from a requesting device. The requesting device may be a client device (e.g., the client device 310, FIG. 3). The request may be received at a load balancer (e.g., the load balancer 220, FIG. 2) or at a storage server including one or more storages (e.g., the first storage server 100 or the second storage server 210, FIG. 2).

At S420, a storage configured to execute a garbage collector is selected. The selected storage may be a default storage, or may be selected based on load balancing among storages.

At S430, it is checked if the garbage collector of the selected storage is turned on and, if so, execution continues with S440; otherwise, execution proceeds to S460 where a portion of the selected storage is allocated as the requested storage space.

At S440, it is checked if the garbage collector can be turned off and, if so, execution continues with S450; otherwise, execution continues with S420, where another storage is selected. The other selected storage may be a storage in which the garbage collector is turned off or may be turned off. In an embodiment, the garbage collector can be turned off when the garbage collector is on but is not currently active. The garbage collector may not be currently active when, for example, the garbage collector is turned on but there is no data to erase. To this end, S440 may include checking if there is data to erase. If there is data to be erased, the garbage collector is currently active and cannot be turned off; otherwise, the garbage collector is not currently active and can be turned off.

In an embodiment, S440 may include determining whether the garbage collector can be turned off. To this end, S440 may include balancing between among multiple storages such that only some of the garbage collectors of the storages are allowed to perform garbage collection at any given time. Specifically, at any given time, garbage collection may be turned on for some storages and turned off for other storages such that storage allocation may be performed only to storages in which garbage collection is turned off. The balancing may be performed such that garbage collection is performed on each storage periodically and at least one of the storages has garbage collection turned off during garbage collection for other of the storages. Alternatively, the balancing may further include determining a rate of garbage collection for each garbage collector such that garbage collectors that are not collecting garbage as quickly may be determined as not needed and, therefore, may be turned off to allow for storage allocation. This balancing may result in write operations directed to the storages being more responsive, and decreasing latency of access to the storages.

Turning off the garbage collector or selecting a different storage when the garbage collector cannot be turned off allows for more efficient execution of the storage allocation as compared to attempting to allocate storage while the garbage collector is turned on, as the storage allocation may be performed faster when the garbage collector is turned off than when the garbage collector is turned on. Further, such faster speed may be achieved without needing to dedicate additional computing resources such as memory to data utilized for garbage collection.

At S450, the garbage collector is turned off. Turning off the garbage collector may include, but is not limited to, ceasing garbage collection until the next garbage collection cycle, until the storage allocation operation is complete (e.g., garbage collection may resume after S460). In some implementations, resumption of the garbage collection may be triggered by the client device (e.g., by receiving an indication from the client device that the storage allocation is complete).

At S460, the requested storage space of the selected storage is allocated to the requesting device. In some implementations, S460 may further include instructing the garbage collector to resume garbage collection when the storage allocation is complete.

At S470, it is determined if additional storage space is requested and, if so, execution continues with S410; otherwise, execution terminates.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

What is claimed is:

1. A method for increased efficiency thin provisioning of a thin provisioned storage system including a plurality of storages, comprising:
   receiving a request for storage allocation from a client device;
   determining, upon receiving the request, whether a garbage collector of a first storage of the plurality of storages is turned on;
   allocating, to the client device, at least a portion of the first storage of the plurality of storages when it is determined that the garbage collector of the first storage is turned off; and
   allocating, to the client device, at least a portion of another storage of the plurality of storages when it is determined that the garbage collector of the first storage is turned on, wherein a garbage collector of the other storage is off when the at least a portion of the other storage is allocated.

2. The method of claim 1, further comprising:
   turning off the garbage collector of the first storage.

3. The method of claim 2, wherein turning off of the garbage collector of the first storage is performed when the garbage collector of the first storage is turned on.

4. The method of claim 3, further comprising:
   turning on the garbage collector of the first storage when at least one of: a next garbage collection cycle begins, and the storage allocation is complete.

5. The method of claim 1, wherein the thin provisioned storage system includes a load balancer and a plurality of storage servers, each storage server further including at least one of the plurality of storages, wherein the load balancer is configured to direct the received storage allocation request to at least one of the plurality of storage servers.

6. The method of claim 5, further comprising:
   balancing, by the load balancer, storage allocation requests among the plurality of storages such that a portion of one of the plurality of storages is allocated when garbage collection is not being performed for the storage, wherein garbage collection is performed for each storage periodically.

7. The method of claim 1, wherein the request is received over a remote direct memory access (RDMA) protocol.

8. The method of claim 7, wherein the RDMA protocol is any one of: Infiniband, RDMA over Converged Ethernet, and Internet Wide Area Remote Direct Memory Access (RDMA) Protocol (iWARP).

9. A non-transitory computer readable medium having stored thereon instructions for causing a processing circuitry to execute a process, the process comprising:
   receiving a request for storage allocation from a client device;
   determining, upon receiving the request, whether a garbage collector of a first storage of a plurality of storages is turned on;
   allocating, to the client device, at least a portion of the first storage of the plurality of storages when it is determined that the garbage collector of the first storage is turned off; and
   allocating, to the client device, at least a portion of another storage of the plurality of storages when it is determined that the garbage collector of the first storage is turned on, wherein a garbage collector of the other storage is off when the at least a portion of the other storage is allocated.

10. A system for increased efficiency thin provisioning of a thin provisioned storage system including a plurality of storages, comprising:
    a processing circuitry; and
    a memory, the memory containing instructions that, when executed by the processing circuitry, configure the system to:
    receive a request for storage allocation from a client device;
    determining, upon receiving the request, whether a garbage collector of a first storage of the plurality of storages is turned on;
    allocate, to the client device, at least a portion of the first storage of the plurality of storages when it is determined that the garbage collector of the first storage is turned off; and
    allocate, to the client device, at least a portion of another storage of the plurality of storages when it is determined that the garbage collector of the first storage is turned on, wherein a garbage collector of the other storage is off when the at least a portion of the other storage is allocated.

11. The system of claim 10, wherein the system is further configured to:
    turn off the garbage collector of the first storage.

12. The system of claim 11, wherein the turning off of the garbage collector of the first storage is performed when the garbage collector of the first storage is turned on.

13. The system of claim 12, wherein the system is further configured to:
    turn on the garbage collector of the first storage when at least one of: a next garbage collection cycle begins, and the storage allocation is complete.

14. The system of claim 10, wherein the thin provisioned storage system includes a plurality of storage servers, each storage server further including at least one of the plurality of storages, further comprising:
    a load balancer, wherein the storage allocation request is received at the load balancer, wherein the load balancer is configured to direct the received storage allocation request to at least one of the plurality of storage servers.

15. A thin provisioned storage system, comprising:
    a plurality of storages, each storage further comprising a garbage collector;
    a processing circuitry; and at least one memory, the at least one memory containing instructions that, when executed by the processing circuitry, configure the thin provisioned storage system to:
receive a request for storage allocation from a client device; and
determine, upon receiving the request, whether a garbage collector of a first storage of the plurality of storages is turned on;
allocate, to the client device, at least a portion of a first storage of the plurality of storages when it is determined that the garbage collector of the first storage is turned off; and
allocate, to the client device, at least a portion of another storage of the plurality of storages when it is determined that the garbage collector of the first storage is turned on, wherein a garbage collector of the other storage is off when the at least a portion of the other storage is allocated.

16. The thin provisioned storage system of claim 15, wherein the thin provisioned storage system is further configured to perform any one of:

allocate, to the client device, at least a portion of another storage of the plurality of storages when the garbage collector of the first storage is turned on, wherein a garbage collector of the other storage is off; and
turn off the garbage collector of the first storage when the garbage collector of the first storage is turned on.

17. The system of claim 15, further comprising:
a plurality of storage servers, wherein each storage server includes at least one of the plurality of storages; and
a load balancer, wherein the load balancer is configured to direct the received storage allocation request to at least one of the plurality of storage servers.

18. The system of claim 17, wherein the load balancer is further configured to:
balance storage allocation requests among the plurality of storages such that a portion of one of the plurality of storages is allocated when garbage collection is not being performed for the storage, wherein garbage collection is performed for each storage periodically.

* * * * *